United States Patent
Aikawa

(10) Patent No.: US 7,385,165 B2
(45) Date of Patent: Jun. 10, 2008

(54) MULTIBEAM TYPE SCANNING MICROSCOPE

(75) Inventor: Naoshi Aikawa, Fujisawa (JP)

(73) Assignee: Nikon Corporation, Tokyo (JP)

(*) Notice: Subject to any disclaimer, the term of this patent is extended or adjusted under 35 U.S.C. 154(b) by 4 days.

(21) Appl. No.: 11/633,384

(22) Filed: Dec. 4, 2006

(65) Prior Publication Data

US 2007/0127003 A1   Jun. 7, 2007

(30) Foreign Application Priority Data

Dec. 7, 2005   (JP) .............................. 2005-353236

(51) Int. Cl.
*G02B 7/04*   (2006.01)
*H01J 3/14*   (2006.01)

(52) U.S. Cl. .................................. 250/201.3; 250/235

(58) Field of Classification Search ............. 250/201.3, 250/201.5, 235, 306, 307, 548; 356/399–402; 359/202, 368; 355/53
See application file for complete search history.

(56) References Cited

U.S. PATENT DOCUMENTS

2002/0163717 A1* 11/2002 Lee ............................. 359/388

* cited by examiner

*Primary Examiner*—Que Tan Le
*Assistant Examiner*—Don Williams
(74) *Attorney, Agent, or Firm*—Frishauf, Holtz, Goodman & Chick, P.C.

(57) ABSTRACT

A multibeam type scanning microscope that has N beams, wherein the system is devised so that the respective beams perform scanning in $L^M$ stages in the Y direction at maximum magnification where the discrete scanning direction is the Y direction, thus performing scanning in an area of $N \times L^M$ stages overall, and scanning is controlled so that the following processes (1) and (2) are successively repeated $L^K$ times at a magnification that is $1/L^K$ times the maximum magnification. Here, L, M and N are integers of 2 or greater, and K is a natural number.
(1) The respective beams perform scanning in the Y direction at a sampling interval that is $L^K$ times that at the maximum magnification.
(2) When scanning of $L^{M-K}$ stages is completed in the Y direction, and the repetition is less than the $L^K$th time, the scanning skips $((N-1) \times L^{M-K}+1)$ stages.

1 Claim, 3 Drawing Sheets

(a)

(b)

MULTIBEAM TYPE SCANNING MICROSCOPE

TECHNICAL FIELD

The present invention relates to a multibeam type scanning microscope.

BACKGROUND ART

There are scanning microscopes in which a two-dimensional image of the sample is acquired by scanning the surface of the sample in the X and Y directions with illuminating light using deflecting mirrors or the like. In such scanning microscopes, the size of the observation area on the sample can be altered (i.e., zooming can be performed) without changing the number of pixels (e.g., 512× 512) by varying the swinging angles of the deflecting mirrors.

DISCLOSURE OF THE INVENTION

[Problems to Be Solved by the Invention]

In the case of such scanning microscopes, multibeam type scanning microscopes which have a plurality of beams of illuminating light have been developed in order to shorten the time required for the acquisition of one image. However, multibeam type scanning microscopes that are capable of zooming have not yet been developed.

The present invention was devised in the light of such circumstances; it is an object of the present invention to provide a multibeam type scanning microscope that is capable of zooming (alteration of the magnification).

[Means Used to Solve the Problems]

The problem described above is solved by means of a multibeam type scanning microscope that has N beams, wherein the system is devised so that the respective beams perform scanning in $L^M$ stages in the Y direction at maximum magnification where the continuous scanning direction is the X direction and the discrete scanning direction is the Y direction, thus performing scanning in an area of N×$L^M$ stages overall, and scanning is controlled so that the following processes (1) and (2) are successively repeated $L^K$ times at a magnification that is $1/L^K$ times the maximum magnification. Here, L, M and N are integers of 2 or greater, and K is a natural number.

(1) The respective beams perform scanning in the Y direction at a sampling interval that is $L^K$ times that at the maximum magnification.

(2) When scanning of $L^{M-K}$ stages is completed in the Y direction, and the repetition is less than the $L^K$th time, the scanning skips $((N-1)\times L^{M-K}+1)$ stages.

[Effect of the Invention]

The present invention makes it possible to provide a multibeam type scanning microscope that is capable of zooming (alteration of the magnification).

BEST MODE FOR CARRYING OUT THE INVENTION

Figure 1:
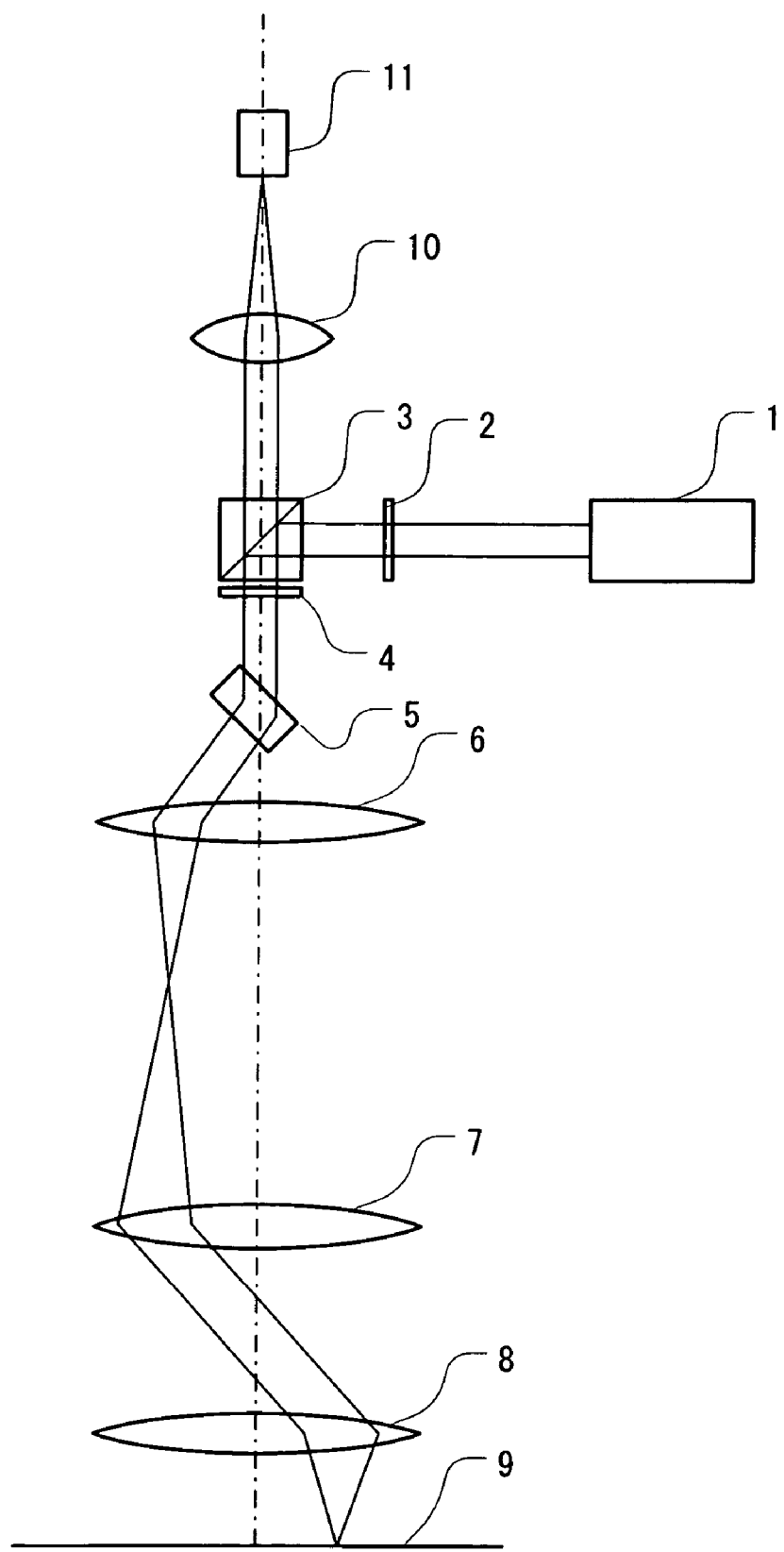
FIG. 1 is a schematic diagram showing the optical system of a multibeam type scanning microscope constituting one working configuration of the present invention.

A working configuration of the present invention will be described below using the figures. FIG. 1 is a schematic diagram showing the optical system of a multibeam type scanning microscope constituting one working configuration of the present invention. In FIG. 1, furthermore, for the sake of simplification, only a single beam is shown. However, in a multibeam type scanning microscope, a plurality of beams of the type shown in the figure are formed at equal intervals.

Laser light from a laser light source 1 is converted into linearly polarized light by a polarizing plate 2, and is reflected by a polarizing beam splitter 3, so that this light is directed downward. Then, the light passes through a λ/4 plate 4, is reflected by a deflecting mirror 5 consisting of a combination of a galvanometer and a piezoelectric element, and is focused on the surface of the sample 9 by lenses 6, 7 and 8.

The light reflected by the surface of the sample 9 passes through the lenses 8, 7 and 6 in the opposite direction from the emitted light, is reflected by the deflecting mirror 5, passes through the λ/4 plate 4, and passes through the polarizing beam splitter 3, so that the light is directed upward. Then, as a result of the action of the lens 10, an image of the illuminated point on the sample 9 is focused on the photoelectric surface of a photoelectric detector 11 (in the case of a multibeam type scanning microscope, a photoelectric detector 11 is installed for each beam).

The deflecting mirror 5 is driven by the galvanometer and piezoelectric element so that the surface of the sample 9 is scanned in the X and Y directions, and image data is prepared and observed from the outputs of the photoelectric detectors 11 at the respective scanning points. In cases where the number of pixels of the image data is the same, the magnification of the observed image is reduced if the swinging angle of the deflecting mirror 5 is increased so that there is an accompanying increase in the sampling interval.

Below, the scanning system in a case where the magnification is varied in a multibeam type scanning microscope constituting one working configuration of the present invention will be described. In the following figures, the horizontal direction in the plane of the page is taken as the X direction, and the vertical direction is taken as the Y direction.

Figure 2:
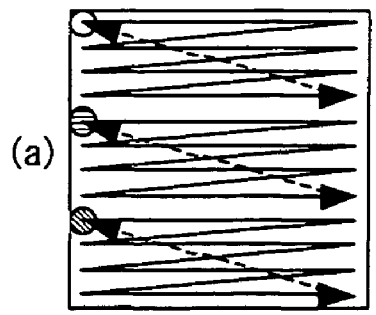
FIG. 2 is a diagram showing the scanning method used when the magnification is the maximum magnification.
Figure 2:
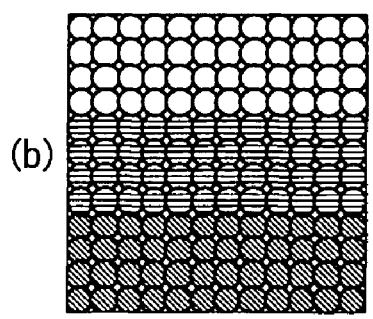

FIG. 2 shows the scanning method used when the magnification is the maximum magnification. As is shown in FIG. 2(a), there are three beams which are disposed at equal intervals in the Y direction. Furthermore, these beams simultaneously perform scanning in the X direction, and when the beams reach the end in the X direction, the beams advance one stage in the Y direction, return to the initial point in the X direction, and again perform scanning in the X direction (raster scan). Scanning of the overall sample surface constituting the object of scanning can be accomplished by repeating this 4($2^2$) times.

FIG. 2(b) shows positions on the scanned sample surface in model form; this is observed as an image with 12×12 pixels. The respective beams scan an area on the sample equal to 12 times the pitch in the X direction and 4 times the pitch in the Y direction. In the following figures including FIG. 2(b), the white circles indicate the area scanned by the first beam, the circles that contain horizontal lines indicate the area scanned by the second beam, and the circles that contain diagonal lines indicate the area scanned by the third beam.

Figure 3:
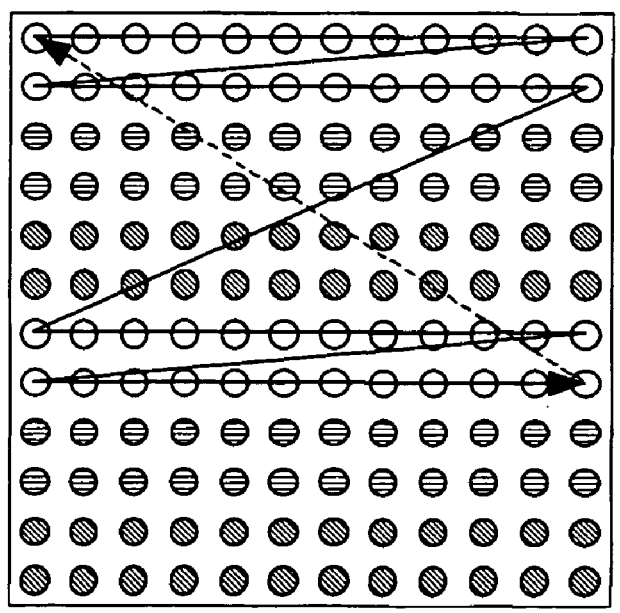
FIG. 3 is a diagram showing the scanning method used when the magnification is set at ½ the maximum magnification.

FIG. 3 shows the scanning method used when the magnification is set at ½(½$^1$) the maximum magnification. This state can be realized by setting the scanning widths in the X direction and Y direction at twice (2$^1$ times) that used in the case of the maximum magnification, and also doubling the sampling interval of the outputs of the photoelectric detectors 11. In this case, the number of stages of scanning in the Y direction is 2 stages, which is ½ that used in the case of the maximum magnification. Furthermore, when the scanning of two stages (2$^{2-1}$ stages) is completed in the Y direction, the scanning next skips 5 stages ((3−1)×2$^{2-1}$+1), and the scanning of 2 stages is then again performed in the Y direction. If this is done, then scanning of the entire object sample surface is possible even in cases where the magnification is set at ½ the maximum magnification.

Figure 4:
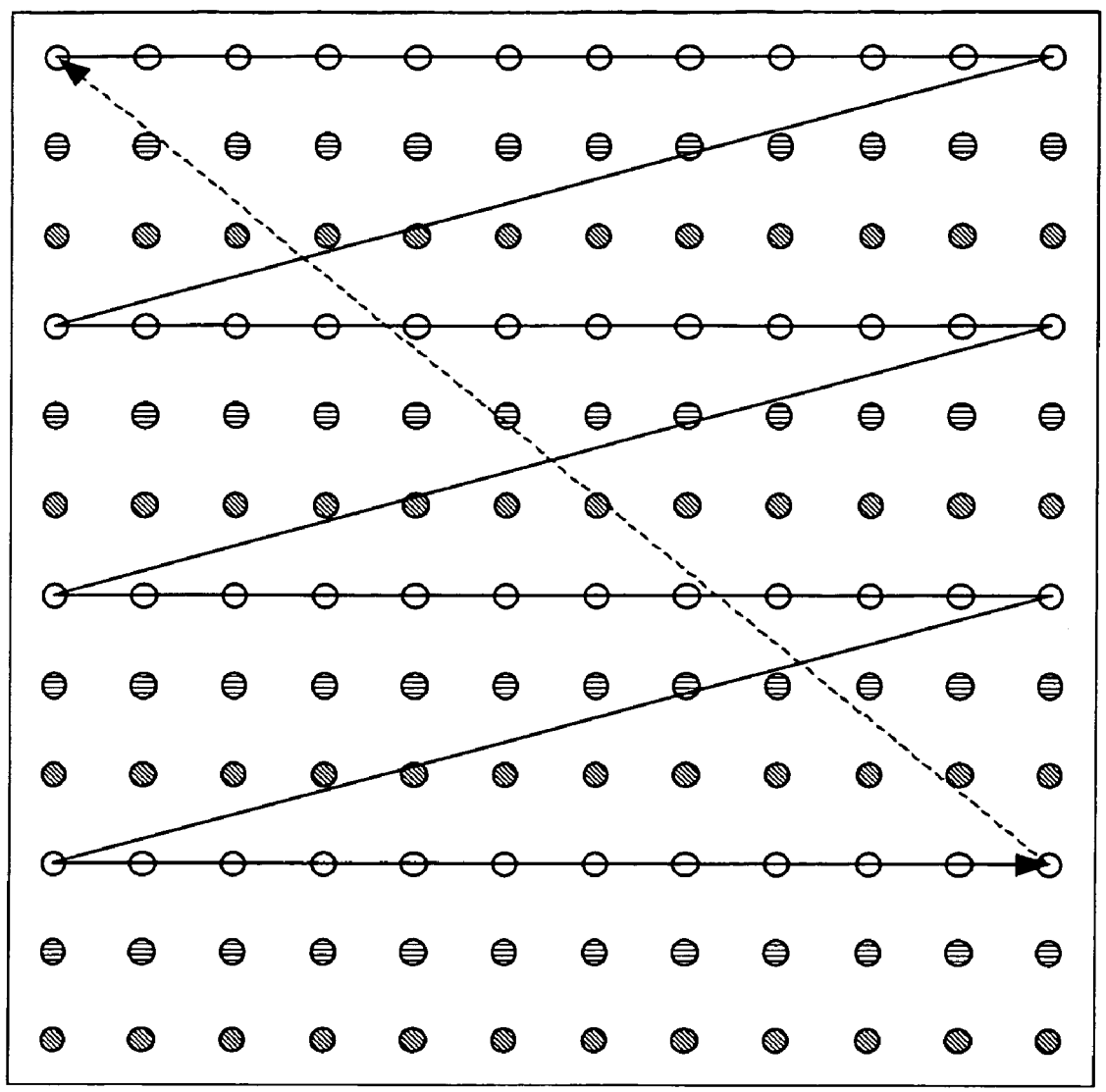
FIG. 4 is a diagram showing the scanning method used when the magnification is set at ¼ the maximum magnification.

FIG. 4 shows the scanning method used when the magnification is set at ¼(½$^2$) the maximum magnification. This state can be realized by setting the scanning widths in the X direction and Y direction at 4 times (2$^2$ times) that used in the case of the maximum magnification, and also quadrupling the sampling interval of the outputs of the photoelectric detectors 11. In this case, the number of stages of scanning in the Y direction is 1 stage, which is ¼ that in the case of the maximum magnification. Furthermore, when the scanning of one stage (2$^{2-2}$) is completed in the Y direction, the scanning next skips 3 stages ((3−1)×2$^{2-2}$+1), and the scanning of one stage is then again performed in the Y direction. If this is done, then scanning of the entire object sample surface is possible even in cases where the magnification is set at ¼ the maximum magnification.

Thus, generally, in a case where N beams are disposed at equal intervals, and the X direction is taken as the continuous scanning direction, while the Y direction is taken as the discrete scanning direction, if the system is devised so that the respective beams perform scanning in L$^M$ stages in the Y direction at maximum magnification, thus performing scanning in an area of N×L$^M$ stages overall, and scanning is controlled so that the following processes (1) and (2) are successively repeated L$^K$ times at a magnification that is 1/L$^K$ times the maximum magnification, then scanning of the entire object sample surface is possible. Here, L, M and N are integers of 2 or greater, and K is a natural number.

(1) The respective beams perform scanning in the Y direction at a sampling interval that is L$^K$ times that at the maximum magnification.

(2) When scanning of L$^{M-K}$ stages is completed in the Y direction, and the repetition is less than the L$^K$th time, the scanning skips ((N−1)×L$^{M-K}$+1) stages in the Y direction.

Furthermore, if pinholes are disposed in positions that are conjugate with the sample directly in front of the photoelectric detectors 11, the microscope can be used as a confocal microscope; moreover, if the polarizing beam splitter 3 is replaced by a dichroic mirror, and fluorescent filters are disposed between the dichroic mirror and the photoelectric detectors 11, then the microscope can be used as a fluorescent confocal microscope. Here, the polarizing plate 2 and λ/4 plate 4 are unnecessary.

The invention claimed is:

1. A multibeam type scanning microscope that has N beams, wherein the system is devised so that the respective beams perform scanning in L$^M$ stages in the Y direction at maximum magnification where the continuous scanning direction is the X direction and the discrete scanning direction is the Y direction, thus performing scanning in an area of N×L$^M$ stages overall, and scanning is controlled so that the following processes (1) and (2) are successively repeated L$^K$ times at a magnification that is 1/L$^K$ times the maximum magnification; where, L, M and N are integers of 2 or greater, and K is a natural number;
   (1) the respective beams perform scanning in the Y direction at a sampling interval that is L$^K$ times that at the maximum magnification;
   (2) when scanning of L$^{M-K}$ stages is completed in the Y direction, and the repetition is less than the L$^K$th time, the scanning skips ((N−1)×L$^{M-K}$+1) stages.

* * * * *